US008782209B2

(12) United States Patent
McHugh et al.

(10) Patent No.: US 8,782,209 B2
(45) Date of Patent: Jul. 15, 2014

(54) INSIDER THREAT CORRELATION TOOL

(75) Inventors: Brian McHugh, Charlotte, NC (US); Ronald Ramcharran, Hackensack, NJ (US); Peter J. Langsam, New York, NY (US); Timothy C. Metzger, Hoboken, NJ (US); Dan P. Antilley, Fort Mill, SC (US); Jonathan W. Deats, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 448 days.

(21) Appl. No.: 12/694,067

(22) Filed: Jan. 26, 2010

(65) Prior Publication Data

US 2011/0185056 A1     Jul. 28, 2011

(51) Int. Cl.
   *G06F 15/173*     (2006.01)

(52) U.S. Cl.
   USPC ........... 709/224; 709/223; 709/225; 709/229; 726/22; 726/23; 726/25

(58) Field of Classification Search
   USPC .......... 709/203, 223–226, 229; 726/22–24, 2, 726/25–28
   See application file for complete search history.

(56) References Cited

U.S. PATENT DOCUMENTS

| | | |
|---|---|---|
| 5,623,600 A | 4/1997 | Ji et al. |
| 6,151,643 A | 11/2000 | Cheng et al. |
| 6,269,456 B1 | 7/2001 | Hodges et al. |
| 6,785,820 B1 | 8/2004 | Muttik et al. |
| 6,792,543 B2 | 9/2004 | Pak et al. |
| 7,080,000 B1 | 7/2006 | Cambridge |
| 7,080,408 B1 | 7/2006 | Pak et al. |
| 7,114,183 B1 | 9/2006 | Joiner |
| 7,151,447 B1 | 12/2006 | Willms et al. |
| 7,228,565 B2 | 6/2007 | Wolff et al. |
| 7,237,258 B1 | 6/2007 | Pantuso et al. |
| 7,237,267 B2 * | 6/2007 | Rayes et al. ............. 726/25 |

(Continued)

FOREIGN PATENT DOCUMENTS

| | | |
|---|---|---|
| EP | 1335559 A2 | 8/2003 |
| GB | 2436161 A | 9/2007 |

OTHER PUBLICATIONS

International Search Report and Written Opinion issued in related International Patent Application No. PCT/US11/21149, dated Oct. 26, 2011.
International Search Report and Written Opinion issued in related International Patent Application No. PCT/US11/21152, dated Nov. 1, 2011.
International Search Report and Written Opinion issued in related application No. PCT/US11/32515, dated Jun. 27, 2011.

(Continued)

*Primary Examiner* — Ramy M Osman
(74) *Attorney, Agent, or Firm* — Banner & Witcoff, Ltd.; Michael A. Springs

(57) ABSTRACT

Systems and methods for calculating threat scores for individuals within an organization or domain are provided. Aspects of the invention relate to computer-implemented methods that form a predictive threat rating for user accounts. In one implementation, a first threat score representing a first time period may be calculated. The first threat score may be compared with aspects of the same user accounts for a second time period. Weighting schemes may be applied to certain activities, controls, and/or user accounts. Further aspects relate to apparatuses configured to execute methods for ranking individual user accounts. Certain embodiments may not block transmissions that violate predefine rules, however, indications of such improper transmission may be considered when constructing a threat rating. Blocked transmissions enforced upon a user account may also be received. Certain activity, such as accessing the internet, may be monitored for the presence of a security threat and/or an ethics threat.

17 Claims, 3 Drawing Sheets

(56) References Cited

U.S. PATENT DOCUMENTS

| | | | |
|---|---|---|---|
| 7,278,019 | B2 | 10/2007 | Norman |
| 7,340,438 | B2 | 3/2008 | Nordman et al. |
| 7,418,733 | B2* | 8/2008 | Connary et al. ............... 709/224 |
| 7,457,965 | B2 | 11/2008 | Tamura et al. |
| 7,509,680 | B1 | 3/2009 | Sallam |
| 7,546,334 | B2 | 6/2009 | Redlich et al. |
| 7,739,211 | B2* | 6/2010 | Coffman et al. ................ 726/23 |
| 7,895,448 | B1* | 2/2011 | Satish ............................ 726/25 |
| 8,256,004 | B1* | 8/2012 | Hill et al. ........................ 726/25 |
| 8,275,899 | B2* | 9/2012 | Beckett et al. ................ 709/225 |
| 8,280,844 | B2* | 10/2012 | Warn et al. .................... 709/223 |
| 8,474,042 | B2* | 6/2013 | Sorensen et al. ............. 709/224 |
| 8,478,708 | B1* | 7/2013 | Larcom .......................... 726/23 |
| 8,479,286 | B2 | 7/2013 | Dalcher et al. |
| 2003/0145228 | A1 | 7/2003 | Suuronen et al. |
| 2003/0191957 | A1 | 10/2003 | Hypponen et al. |
| 2003/0236995 | A1 | 12/2003 | Fretwell |
| 2004/0044912 | A1* | 3/2004 | Connary et al. ............... 709/224 |
| 2004/0153650 | A1 | 8/2004 | Hillmer |
| 2005/0044406 | A1* | 2/2005 | Stute ............................ 709/224 |
| 2005/0050334 | A1 | 3/2005 | Liang et al. |
| 2005/0086526 | A1 | 4/2005 | Aguirre |
| 2005/0183143 | A1 | 8/2005 | Anderholm et al. |
| 2005/0187934 | A1* | 8/2005 | Motsinger et al. ................ 707/9 |
| 2005/0188221 | A1 | 8/2005 | Motsinger et al. |
| 2005/0188222 | A1* | 8/2005 | Motsinger et al. ............ 713/201 |
| 2005/0188423 | A1* | 8/2005 | Motsinger et al. .............. 726/22 |
| 2005/0203881 | A1* | 9/2005 | Sakamoto et al. ................ 707/3 |
| 2005/0273851 | A1* | 12/2005 | Raju Datla et al. ............. 726/14 |
| 2006/0004594 | A1 | 1/2006 | Doliov |
| 2006/0020814 | A1* | 1/2006 | Lieblich et al. ............... 713/182 |
| 2006/0041505 | A1 | 2/2006 | Enyart |
| 2006/0064740 | A1 | 3/2006 | Kelley et al. |
| 2006/0178918 | A1 | 8/2006 | Mikurak |
| 2007/0079379 | A1 | 4/2007 | Sprosts et al. |
| 2007/0113281 | A1 | 5/2007 | Leach |
| 2007/0143851 | A1 | 6/2007 | Nicodemus et al. |
| 2007/0169194 | A1 | 7/2007 | Church et al. |
| 2007/0180510 | A1 | 8/2007 | Long et al. |
| 2007/0186282 | A1 | 8/2007 | Jenkins |
| 2007/0204345 | A1* | 8/2007 | Pereira et al. ................... 726/24 |
| 2007/0222589 | A1 | 9/2007 | Gorman et al. |
| 2007/0226796 | A1 | 9/2007 | Gilbert et al. |
| 2007/0245420 | A1* | 10/2007 | Yong et al. ...................... 726/23 |
| 2007/0268880 | A1 | 11/2007 | Bellur et al. |
| 2008/0034424 | A1 | 2/2008 | Overcash et al. |
| 2008/0082348 | A1 | 4/2008 | Paulus et al. |
| 2008/0109730 | A1 | 5/2008 | Coffman et al. |
| 2008/0162385 | A1 | 7/2008 | Madani et al. |
| 2008/0181213 | A1 | 7/2008 | Ovsiannikov et al. |
| 2008/0198231 | A1* | 8/2008 | Ozdemir et al. ............. 348/159 |
| 2008/0222734 | A1 | 9/2008 | Redlich et al. |
| 2008/0250484 | A1 | 10/2008 | Chong et al. |
| 2008/0256602 | A1 | 10/2008 | Pagan |
| 2008/0271143 | A1* | 10/2008 | Stephens et al. ................ 726/22 |
| 2008/0282339 | A1 | 11/2008 | Nakae et al. |
| 2009/0013410 | A1* | 1/2009 | Kaler et al. ..................... 726/25 |
| 2009/0037997 | A1 | 2/2009 | Agbabian et al. |
| 2009/0043724 | A1 | 2/2009 | Chesla |
| 2009/0044005 | A1 | 2/2009 | Komura et al. |
| 2009/0064332 | A1 | 3/2009 | Porras et al. |
| 2009/0077666 | A1 | 3/2009 | Chen et al. |
| 2009/0126023 | A1 | 5/2009 | Yun et al. |
| 2009/0132813 | A1 | 5/2009 | Schibuk |
| 2009/0138592 | A1 | 5/2009 | Overcash et al. |
| 2009/0178139 | A1 | 7/2009 | Stute et al. |
| 2009/0178144 | A1 | 7/2009 | Redlich et al. |
| 2009/0198765 | A1 | 8/2009 | Stamos et al. |
| 2009/0207740 | A1 | 8/2009 | Crotti et al. |
| 2009/0241188 | A1 | 9/2009 | Komura |
| 2009/0249131 | A1 | 10/2009 | Mitomo |
| 2009/0254572 | A1 | 10/2009 | Redlich et al. |
| 2009/0271863 | A1 | 10/2009 | Govindavajhala et al. |
| 2009/0293128 | A1 | 11/2009 | Lippmann et al. |
| 2009/0328209 | A1 | 12/2009 | Nachenberg |
| 2010/0064039 | A9 | 3/2010 | Ginter et al. |
| 2010/0065039 | A1 | 3/2010 | Chang et al. |
| 2010/0121833 | A1* | 5/2010 | Johnston ....................... 707/706 |
| 2010/0125911 | A1* | 5/2010 | Bhaskaran ...................... 726/23 |
| 2010/0169971 | A1 | 7/2010 | Raviv |
| 2010/0212010 | A1 | 8/2010 | Stringer et al. |
| 2010/0269175 | A1* | 10/2010 | Stolfo et al. .................... 726/22 |
| 2010/0281543 | A1 | 11/2010 | Golomb et al. |
| 2011/0078156 | A1 | 3/2011 | Koss |
| 2011/0125658 | A1* | 5/2011 | Lanxner et al. ............... 705/318 |
| 2011/0153166 | A1 | 6/2011 | Yester |
| 2011/0185056 | A1 | 7/2011 | McHugh et al. |
| 2011/0202969 | A1 | 8/2011 | Warn et al. |
| 2011/0225650 | A1 | 9/2011 | Margolies et al. |
| 2012/0066763 | A1* | 3/2012 | McHugh et al. ................ 726/22 |

OTHER PUBLICATIONS

Office Action in related U.S. Appl. No. 12/694,067 mailed Jul. 30, 2013.
Non-Final office action for related U.S. Appl. No. 13/298,597 mailed Sep. 11, 2013.
Non-Final office action in related U.S. Appl. No. 13/903,215 mailed Sep. 12, 2013.
Office action in related application No. 13/736,594 mailed Oct. 2, 2013.
International Search Report and Written Opinion of International application No. PCT/US11/44144 mailed Dec. 6, 2011.
Office Action for U.S. Appl. No. 12/841,332 mailed Oct. 1, 2013.
Office action for U.S. Appl. No. 12/841,332 mailed Mar. 7, 2013.
Office action for U.S. Appl. No. 12/841,332 mailed Sep. 26, 2012.
Office action for U.S. Appl. No. 12/841,323 mailed Nov. 29, 2012.
Office action for U.S. Appl. No. 12/841,323 mailed Jun. 6, 2012.
Notice of Allowance for U.S. Appl. No. 12/841,323 mailed Apr. 11, 2013.
International Search Report and Written Opinion for International application No. PCT/US11/44138 mailed Dec. 6, 2011.
Office action for U.S. Appl. No. 13/298,594 mailed Nov. 14, 2013.
Office action for U.S. Appl. No. 13/298,594 mailed Jun. 19, 2013.
Office action for U.S. Appl. No. 12/694,075 mailed Sep. 4, 2013.
Office action for U.S. Appl. No. 12/694,075 mailed Feb. 4, 2013.
Office action for U.S. Appl. No. 12/694,075 mailed Aug. 10, 2012.
Office action for U.S. Appl. No. 12/694,075 mailed Mar. 27, 2012.
Notice of Allowance for U.S. Appl. No. 12/829,882 mailed Jun. 17, 2013.
Office action for U.S. Appl. No. 12/829,882 mailed Mar. 12, 2013.
Office action for U.S. Appl. No. 12/829,882 mailed Aug. 10, 2012.
Notification of Grant from Singapore Patent Office for Patent P-No. 184508 dated Nov. 15, 2013.
Office action for U.S. Appl. No. 11/932,510 mailed Dec. 2, 2013.
Office action for U.S. Appl. No. 11/932,510 mailed Jul. 11, 2013.
Office action for U.S. Appl. No. 11/932,510 mailed Feb. 7, 2011.
Office action for U.S. Appl. No. 11/932,510 mailed Sep. 28, 2010.
International Search Report and Written Opinion for International application No. PCT/US2008/082087 mailed Jan. 13, 2009.
Examination Report for application No. GB1007370.8 mailed Jan. 24, 2012.
Notification of Grant for patent application No. GB2466755 mailed Jan. 2, 2013.
Notice of Allowance for related U.S. Appl. No. 12/694,067 mailed Dec. 9, 2013.
Office Action for related U.S. Appl. No. 12/694,075 mailed Mar. 13, 2014.
Notice of Allowance in related U.S. Appl. No. 12/841,332 mailed Mar. 6, 2014.
Notice of Allowance in related U.S. Appl. No. 13/298,594 mailed May 12, 2014.
Notice of Allowance in related U.S. Appl. No. 13/298,597 mailed Apr. 14, 2014.

* cited by examiner

INSIDER THREAT CORRELATION TOOL

BACKGROUND

Increasingly, organizations are responsible for protecting individual's confidential and proprietary electronic information. For example, financial institutions collect and retain vast amounts of personal information in electronic format, therefore the storage and distribution of such information must be closely monitored. This is also true for medical organizations that must effectively collect, store and distribute vast amounts of electronic data while complying with HIPPA (Health Insurance Privacy and Portability Act) and other regulations. Regulating access and distribution of electronic confidential information is more difficult than physical data as it is more readily copied and distributed. Thus, organizations with such information must closely monitor their employees and other individuals to ensure the information is protected, not only from disclosure, but inadvertent contamination.

Prior systems attempted to block certain activities, such as visiting certain sites on the Internet or accessing certain storage devices containing confidential information. Unfortunately, however, blocking sites alone does not provide any indication of a threat. Furthermore, while it may be desirable to block transmissions that pose a serious threat to the organization, blocking each transmission that violates any rule could reduce productivity, efficiency, and frustrate both the holder of the blocked user account, the IT department, and/or any third party that needs to receive the transmission, such as time-sensitive material. Additionally, many systems apply a "one size fits all" security policy, which cannot consider the type of user account being monitored.

Certain prior systems only measure a single or a small quantity of related controls. Thus, entities must purchase and maintain several different systems, which are often incompatible. Unfortunately, reviewing the output of several systems consumes valuable resources, both in terms of time and equipment. Despite the expenditure of resources, correlations across different controls are not noticed, and if they are noticed, it is often too late to prevent or adequately reduce adverse impacts, events, and/or effects from inappropriate or unauthorized activity. Further, prior systems also do not provide an overall threat rating that considers several different security measures for individuals within an entity or domain. In this regard, even if an entity has enacted several individual security measures, a specific user may not meet the "threshold" level to be considered a threat for each individual security measure, despite the fact that they have significantly high activity for several measures, and thus pose an overall threat. In contrast, a user who exceeds one security "threshold" level for only a single measure may incorrectly be deemed a security threat to the entity or domain. In this regard, current systems don't adequately consider individual characteristics of accounts. For example, certain job responsibilities may require some users to have higher than usual activity levels.

Current systems for collecting data from different systems strain valuable resources. Often, the time spent collecting data exceeds the time available to stop or minimize the threat. Therefore, the lag in data does not present an up-to-date indication of the entity's current threats. Moreover, current systems do not allow quick analysis of threats that may readily be navigated for more precise information. Novel systems and methods that improve upon one or more of these and other deficiencies would be desirable.

BRIEF SUMMARY

Aspects of the embodiments address one or more of the issues mentioned above by disclosing methods, computer readable media, and apparatuses configured to calculate threat ratings. Aspects of the invention relate to computer implemented methods that form a predictive threat rating for a plurality of individuals. The plurality of individuals may be members of an organization, such as a corporation or business entity. In one embodiment, the predictive rating is calculated for employees of an organization.

In one implementation, a first threat score corresponding to a first time period may be calculated for several user accounts. The first time period may be relatively short, such as less than 3 days. In one embodiment, the first time period may be about 48 hours. In another embodiment, the first time period may be about 1 day. Those skilled in the art will appreciate that the exact length of the first time period may be different, and may depend on the type of user accounts, the type of organization hosting the accounts, the length of a second time period (discussed below) and/or other factors. In one embodiment, each user account may have access to a first network, such as the Internet. Some of the user accounts may also have access to a second network, such as a restricted portion of the organization's intranet.

In one embodiment, certain activity, such as accessing the internet, may be monitored for the presence of a security threat, an ethics threat, or combinations thereof. The monitoring of activity may include blocked activity, in which the user account was prohibited from undertaking an action or viewing an internet page. An indication of blocked transmissions enforced upon a user account may also be received. The indication may be restricted to a specific network or group of networks, such as the Internet and/or specific network resources within an organization's intranet that may be restricted to certain user accounts In one embodiment, an indication of blocked and/or non-blocked transmissions, including any observable activity relating to correspondence or attempted correspondence through a targeted communication application, may be received. As used herein and throughout this disclosure, transmissions may include, but are not limited to: set up messages, protocol negotiation, and/or any observable activity that may occur during an attempt to transmit correspondence to or from at least individual or electronic device associated with a user account. Exemplary targeted communication accounts include but are not limited to: e-mail and instant messaging. Thus, certain embodiments may not block transmissions that violate one or more predefine rules, however, indications of such improper transmission may be considered when constructing a threat rating in accordance with various embodiments.

In another embodiment, it may be determined if any transmission through a network is transmitted or received through an unauthorized protocol. An indication whether at least one security application is associated with the user account may be received. If the security application is not associated with the account, a specific sub-score may be assigned. Further embodiments determine if the security application has been tampered with or removed, and if so, may assign a different sub-score. In one embodiment, the security application may monitor illegal storage attempts.

In one embodiment, certain activity may be weighted. For example, weights may be applied to: a security threat, an ethics threat, blocked transmission through the targeted communication application, transmission through the targeted communication application meeting a predefined criterion, accessing the centralized store, an attempted illegal storage attempt, and combinations thereof. In other embodiments, certain user accounts may be weighted. Weighting may be based upon, for example, the account having access to certain data storage devices, whether the account is associated with a security application, job criteria associated with the user of the account, or meeting any predefined criteria.

In further embodiments, the threat score from the first time period may be compared, or otherwise analyzed in conjunction with a second threat score corresponding to a second time period to create an overall threat score. Further weighting may also be considered in one or more embodiments. In one embodiment, an activity weight is applied to certain activities that occurred during a first time frame within the first or second time period. For example, illustrative time frames may include, but are not limited to: a predefined quantity of time before the user associated with the user account is scheduled to utilize a network, a predefined quantity of time before or after the average time frame the user account is active on a network, a holiday, and combinations thereof. Indeed, novel aspects of certain embodiments consider whether the user account comprises an activity level during a time frame within the first time period that is determined to be before or after the average start or end time for that user account. For example, if a user account suddenly shows a lot of activity during a different frame (i.e., about 6 hours before they are scheduled to work) this may be weighted to further increase the user account's ranking In one embodiment, the user account's activity level during a second time period (which may be expressed as an average) is compared with the recent activity level. In other embodiments, certain time frames, such as holidays, weekends may be weighted in additional analysis. Weighting may depend on one or more factors, including for example, the user account's average activity, average activity of other user accounts, or combinations thereof.

Aspects of the embodiments may be provided in a computer-readable medium having computer-executable instructions to perform one or more of the process steps described herein. These and other aspects of the embodiments are discussed in greater detail throughout this disclosure, including the accompanying drawings.

Further aspects relate to systems and methods for displaying the ranking of a plurality of user accounts. In one embodiment, the ranking of several user accounts may be transmitted through a network and displayed as part of a graphical user interface. In one embodiment, a system which comprises a processor and a memory may be configured to transmit electronic signals configured to display the ranking of the user accounts. Further embodiments relate to receiving one or more user inputs selecting a graphical representation of certain activities or criteria utilized in the ranking of the user accounts. In one embodiment, a graphical display of blocked transmissions may be displayed. In further embodiments, it may be displayed whether the blocked transmission was a security threat, an ethics threat or combinations thereof. Any aspect of a user account that may be utilized in calculating the threat score may be displayed.

Further embodiments allow the reception of a user input providing a new account weight to be applied to at least one of the plurality of user accounts. The accounts, or at least a portion thereof, may be reranked using the new account weight. In another embodiment, a user input may provide a new weight for at least one control. In further embodiments, a user input may select a user account from the plurality of user accounts, and in response, ranking for a plurality of controls may be displayed for the selected account. Further embodiments may permit the displaying of data relating a user account's average activity (i.e., per control) and/or the average activity of other user accounts.

BRIEF DESCRIPTION OF THE DRAWINGS

The present invention is illustrated by way of example and not limited in the accompanying figures in which like reference numerals indicate similar elements and in which.

DETAILED DESCRIPTION

In accordance with various aspects of the embodiments, methods, computer-readable media, and apparatuses are disclosed that assist in the creation, implementation, and review of predictive threat ratings for several user accounts. The user accounts may be related to an organization, such as employees of an organization. As discussed in more detail throughout this disclosure, systems and processes may provide information regarding a user account's activity over a relatively short time period, such as for example, 24-48 hours, to quickly and effectively detect potential threats and/or liabilities. Certain embodiments may be implemented such that apparent increases in improper activity are viewed in the context of major deadlines, and properties inherent of one or more user accounts. Thus, values obtained during the first time period (for example, the previous 24-48 hours) may be compared with other values (such as obtained from the previous 30-45 days) to more accurately determine one or more rankings. Those skilled in the art will readily understand that the length of the time periods may depend on a myriad of factors, including the type of activity conducted, the organization's structure and activities, the IT infrastructure, and other factors.

Figure 1:
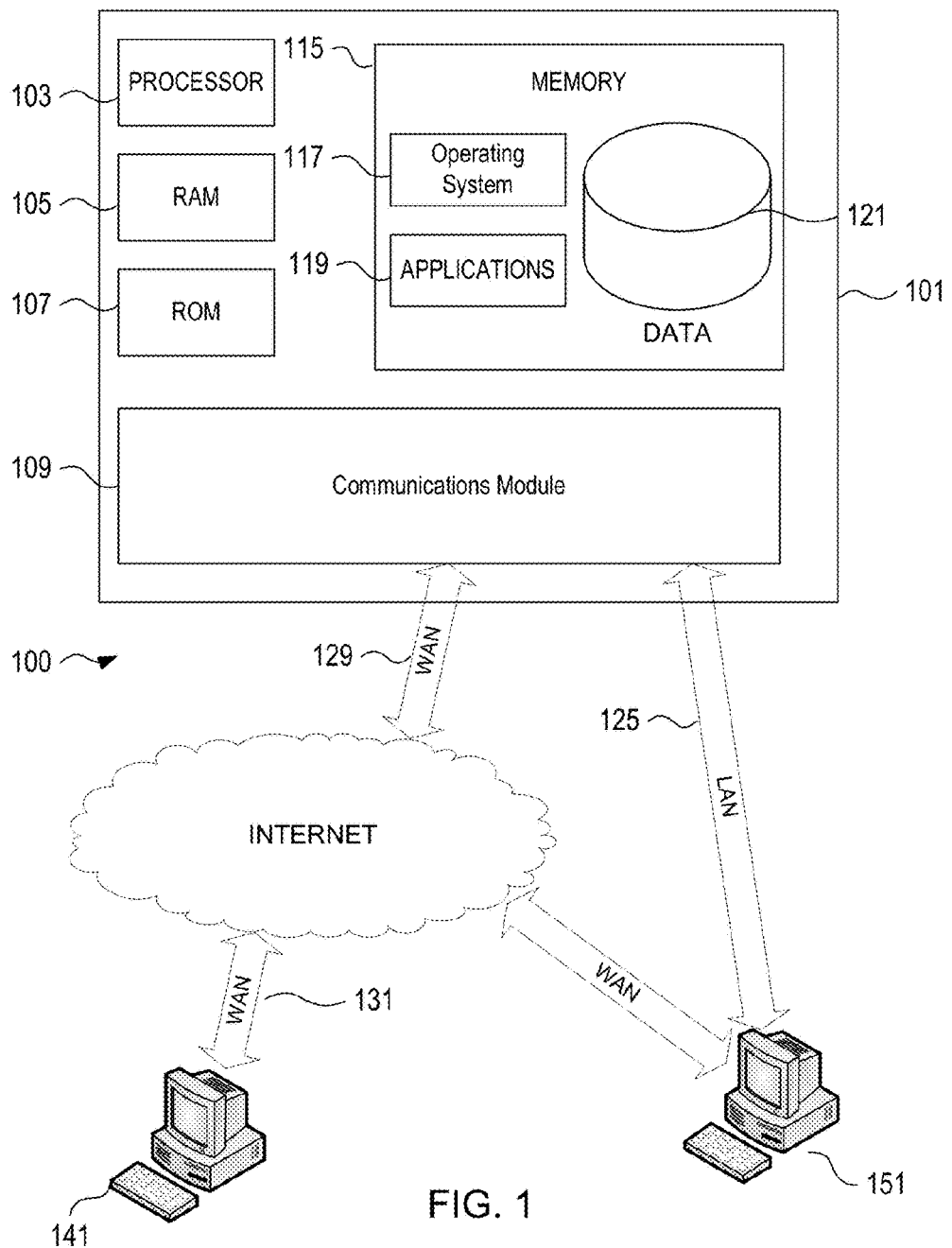
FIG. 1 shows an illustrative operating environment in which various aspects of the embodiments may be implemented.
Figure 2:
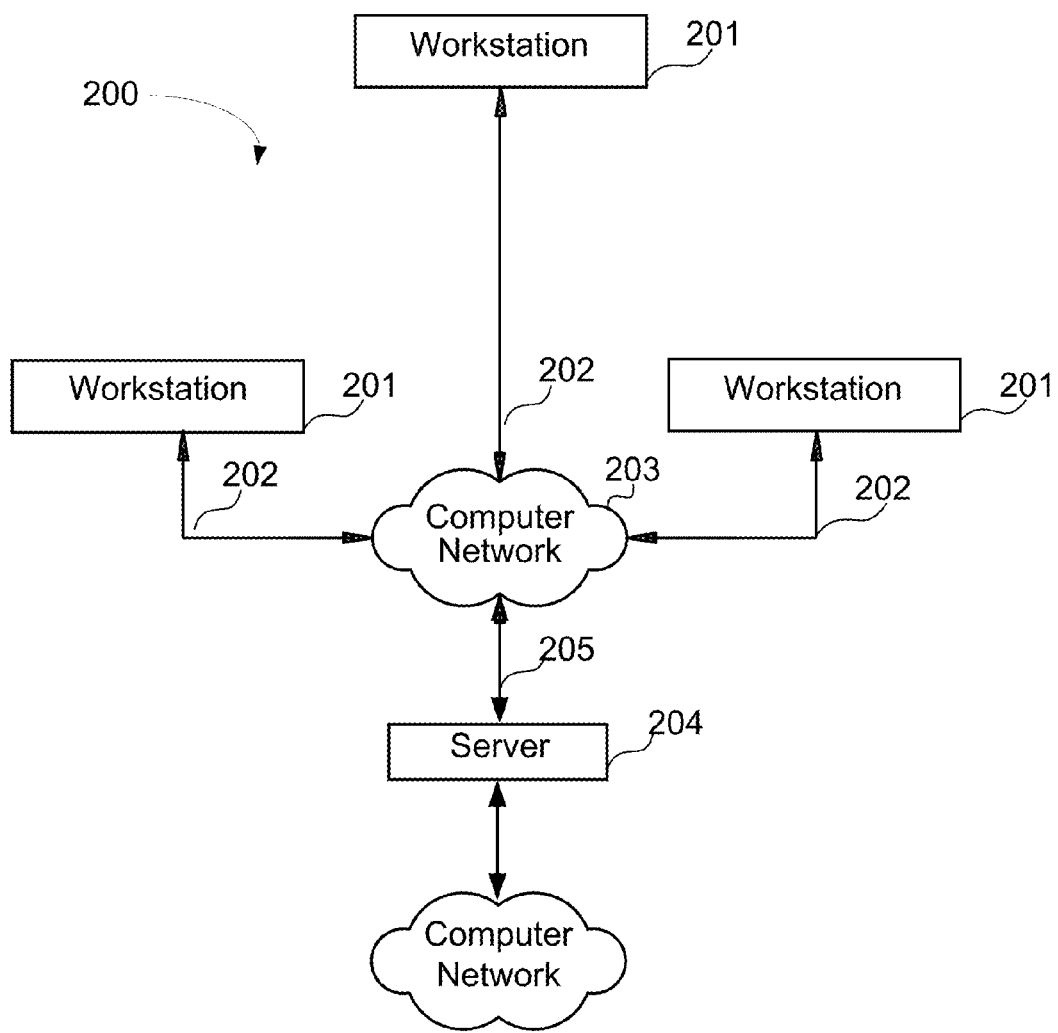
FIG. 2 is an illustrative block diagram of workstations and servers that may be used to implement the processes and functions of certain aspects of the embodiments.
Figure 3:
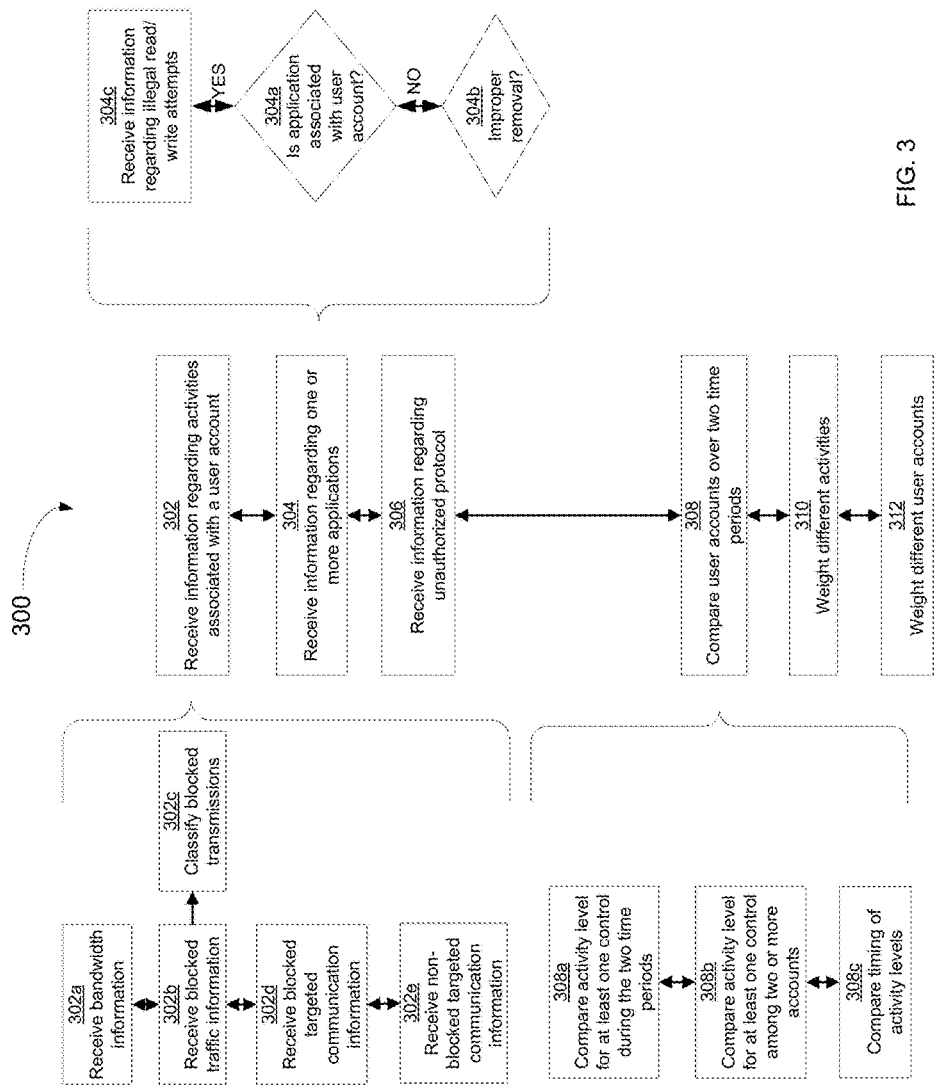
FIG. 3 shows a flow diagram of an illustrative method in accordance with one embodiment.

FIG. 1 illustrates an example of a suitable computing system environment 100 (e.g., for which may be part of illustrative system 200 and/or perform one or more aspects of illustrative process 300 (as shown in FIGS. 2 and 3, respectively). The computing system environment 100 is only one example of a suitable computing environment and is not intended to suggest any limitation as to the scope of use or functionality of the embodiments. The computing system environment 100 should not be interpreted as having any dependency or requirement relating to any one or combination of components shown in the illustrative computing system environment 100.

The embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101. In one embodiment, RAM 105 and/or any other memory may include a security application. The security application may assist in monitoring activity of one or more user accounts on one or more other devices, such as devices 141 and 151, which are described in more detail below Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As discussed above, memory 115 may comprise one or more security applications, some of which will be described below.

Database 121 may provide centralized storage of response information. Processor 103 may access the response information from database 121 and process the response information that may be included in an interactive response to a user. While database 121 is shown to be internal to computing device 101, database 121 may be external to computing device 101 with some embodiments.

Computing device 101 may operate in a networked environment supporting connections to one or more remote computing devices, such as user terminals 141 and 151. Additional computing devices and the arrangement of such devices are described in illustrative embodiment shown in FIG. 2. The user computing devices 141 and 151 may be personal computing devices or servers that include many or all of the elements described above relative to the computing device 101.

The network connections depicted in FIG. 1 include connections through multiple networks. For example, in one embodiment, a local area network (LAN) 125, may be an organization's intranet, and a wide area network (WAN) 129, may be the Internet. In one embodiment implementing a LAN networking environment, computing device 101 may be connected to the LAN 825 through a network interface or adapter in the communications module 109. When used in a WAN networking environment, the server 101 may include a modem, modem, or interface in the communications module 109 or other means for establishing communications over the WAN 129, such as the Internet 131. Thus, from a security perspective, one user account may be configured to access a LAN, such as LAN 125, however, not to access one or more WANs, such as WANs 129/130.

It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, and/or user terminals 141/151 according to an illustrative embodiment, may include computer executable instructions for invoking user functionality related to communication including, for example, email, short message service (SMS), and/or other targeted communications applications that transmit communications from a user account to a second user account (whether internal or external to the organization or domain of the first user account).

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing device 101. Such a processor may execute computer-executable instructions stored on a computer-readable medium.

Referring to FIG. 2, an illustrative system 200 for implementing methods according to some embodiments is shown. As illustrated, system 200 may include one or more workstations 201. In one embodiment, workstations 201 are similar to user terminals 141/151 shown in FIG. 1. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc. Connectivity may also be supported to a CCTV or image/iris capturing device.

With some embodiments, illustrative system 200 may support an interactive system as will be further discussed. For example, workstations 201 may function as user terminals and server 204 may function as a security application control system that monitors activities of multiple user accounts on workstations 201. As understood by those skilled in the art, the steps that follow in the FIGS may be implemented by one or more of the components in FIGS. 1 and 2 and/or other components, including other computing devices.

Aspects of the invention are directed to collecting, analyzing, and utilizing data to create a threat rating for several user accounts within an organization or domain. FIG. 3 shows flow diagram 300 for ranking a plurality of user accounts that represent a threat to an organization. In one embodiment, one or more of the "user account" may be associated with a particular individual, such as an employee of an organization. Thus, regardless of whether the individual is using user terminal 141, user terminal 151, or any workstation 201, the individual's actions may be tied to a particular user account. In an alternative embodiment, a "user account" may be associated with a particular computing device. Thus, in one embodiment, if any of a plurality of individuals use a particular computing device, such as user terminal 141, the computing device will be a specific user account. In another embodiment, a "user account" may be a combination of specific user(s) on specific computing device(s).

As would be understood by those skilled in the art, it is quite common for a subset of user accounts within an organization or domain to have access to resources not available to other user accounts within the same organization or domain. Unlike prior art systems, embodiments disclosed herein may be used to implement, monitor and review a ranking system across an organization or domain having user accounts with security features that differ from other user accounts. For example, in one embodiment, each user account may have access to a first network, such as the "Internet" through WAN 131 shown in FIG. 1, however, only a subset of those accounts may have access to a second network, such as specific resources accessible on the organization's or domain's intranet, such as through LAN 125. In one embodiment, the resources may include a centralized store of electronic data that is accessible from several different user terminals 141/151 or workstations 201.

In various embodiments, a plurality of activities serve as controls for monitoring the accounts over a first time period, such as 24-48 hours. Enabling the reception of data within the relatively short period allows IT or security personnel to act quickly to prevent or minimize any adverse events. In certain embodiments, monitoring the activity for about 24-48 ensures adequate collection of data. The values received for each control may be compared with values from the controls during a second time period. In the illustrated embodiment, block 302 may be implemented to receive an indication of values for one or more activities associated with a user account. In one embodiment, one or more computer—executable instructions measure at least a portion of the activities on computing devices, such as user terminals 141/151 and/or workstation 201. The computer-executable instructions may be read by processor 103 on device 101 shown in FIG. 1.

Exemplary activities are described below, however, those skilled in the art with the benefit of this disclosure will readily understand that additional or fewer activities may be measured without departing from the scope of the invention. Further, while the exemplary activities are described in relation to block 302, those skilled in the art will understand that such actions may be conducted in relation to one or more additional processes.

In one embodiment, one or more values indicating the bandwidth utilized by a user account may be received at block 302*a*. The values may indicate the amount of data received, transmitted, or combinations thereof. The measured valued may indicate the transfer of data through a first network, such as through WAN 131 to the Internet. Thus, in certain embodiments, the values may not measure all traffic through multiple networks, but rather may just be indicative of specific traffic, such as sites that are external to an organization's resources.

An indication of blocked transmissions enforced upon a user account may also be received (see e.g., block 302*b*). The indication of blocked transmissions may be restricted to a specific network or group of networks. For example, in one embodiment, indications may be for activity on the Internet. Yet in other embodiments, the indications may include activity on the Internet as well as specific network resources within an organization's intranet that may be restricted to certain user accounts. Thus, unlike certain prior art systems, certain embodiments may allow for the quantification of how many instances the user account's actions on a network are blocked.

Further embodiments may classify the blocked transmissions as posing an ethical threat or a security threat. Although certain prior art systems may classify the type of site by the type of material offered on the site, such as adult content or gambling, such classification is often insufficient or too labor intensive for security or IT professionals to determine if the site is a security threat and/or an ethical threat. Thus, such classification may be inapplicable for determining the threats to the organization or domain. Block 302*c* may be implemented to classify the blocked transmission(s). In one embodiment, one or more of the blocked transmissions are classified as either posing an ethical threat, a security threat, or both an ethical threat and a security threat. In one embodiment, content classified as adult, gambling, and/or dating may be considered an ethical threat. For example, sites that may contain objectionable material or material that could not be needed for the individual's job duties may be deemed an ethical violation. In one embodiment, sites that are routinely utilized to transfer proprietary data, such as ftp (file transfer protocol) sites or peer-to-peer (P2P) sites may be classified as a security threat. Sites that promote illegal activity, such as introducing malware or viruses may be deemed a security threat. Indeed, certain sites may pose both a security threat and an ethical threat.

Further embodiments may also monitor (or receive indications from the monitoring of) targeted communications applications. As used herein, a "targeted communication application" encompasses those applications that allow a first user to directly communicate with another individual. For example, common targeted communication applications include, but are not limited to: electronic mail (e-mail), instant messaging (IM), chatting, and combinations thereof. Such applications may allow one account associated with a first user, which may be an employee of the organization to transmit and/or receive electronic information directly with a second account associated with a second user, which may be external to the organization. Often, organizations filter outgoing email and block transmissions that violate one or more predefined criteria. For example, if the transmission contains inappropriate material or is of a certain size, it may be blocked or otherwise prevented from reaching the intended account in the typical manner.

In one embodiment, block 302d may be implemented to receive an indication of blocked transmissions, including communications, through a targeted communication application. The indication may indicate what application was blocked, why the application was blocked and other information. In one embodiment, the blocked transmission is classified as a security and/or ethical threat. Such information may be stored in a database and accessible by a graphical user interface ("GUI"), including by methods described in more detail later in this disclosure. Indeed, any information collected, transmitted, or received herein may be preserved and utilized for display in a GUI.

In certain embodiments, non-blocked transmission through one or more targeted communication applications that violate at least one predefined criteria is considered (block 302e). Block 302e may be performed in conjunction with or independent of block 302d. In that regard, while it may be desirable to block transmissions that pose a serious threat to the organization, blocking each transmission that violates any rule could reduce productivity, efficiency, and frustrate both the holder of the blocked user account, the IT department, and/or any third party that needs to receive the transmission, such as time-sensitive material. Thus, certain embodiments may not block transmissions that violate one or more predefine rules, however, indications of such improper transmission may be considered when constructing a threat rating in accordance with various embodiments of the invention. In some embodiments, the non-blocked transmission may be altered to partially or wholly remedy the violation. For example, if an organization prohibits the transmission of certain identifying information, such as Social Security numbers, the number may be removed from the transmission and then transmitted.

While several different types of data are received within block 302, such as from sub-blocks 302a-302e, there is no requirement that the data is treated equally. Indeed, as discussed above, block 302c may be implemented to distinguish activities that may pose an ethical threat or a security threat. In this regard, certain aspects of this disclosure relate to the weighting of different data. Discussions relating to weighting are provided further in this disclosure, however, the reader is advised that such weighting may be conducting before, during, or after almost any process described herein. For example, data may be weighted as it is collected, further weighted in a sub-block (e.g., 302c), and data that is collected from several different sources may then be weighted when compared with other data. Illustrative processes will be discussed in more detail later.

Block 304 may be implemented to receive information regarding one or more applications associated with the user accounts. In one embodiment, the information relates to whether a security application is associated with the user account. The security application may be installed on user terminals 141/151 or workstation 201. In other embodiments, the security application may be active on a centralized server or device, such as device 101. Those skilled in the art will readily appreciate that one or more applications may be active at multiple locations and at different times. Block 304a may be implemented to determine if a specific application is associated with a user account. This process may be advantageous to detect new account users who may not have the security application. It may also be implemented to ensure that user accounts have an up-to-date version or patch of the application.

If at block 304a, it is determined that the user account is not associated with an application, block 304b may be implemented to determine if the application has been improperly disabled or removed. If it's determined at block 304a that the user account is associated with the security application, then one or more indications regarding the application may be received. In one embodiment, block 304c may be implemented to monitor (or receive an indication of) illegal storage attempts. For example, the security application may be implemented for data loss prevention ("DLP") purposes and can monitor illegal write attempts. For example, some user accounts may be prohibited from writing to removable storage devices, such as USB thumb drives. Thus, block 302c may provide an indication of any such attempts. While the illustrative embodiment is described in relation to "write" attempts, those skilled in the art will readily appreciate that "reading" from certain sources may also violate one or more predefined rules. Information associated with the illegal write/read attempts may also be collected. Illustrative information may include, but is not limited to: the filename, the size of the file, the location of the file, or any metadata regarding the file.

Further embodiments may determine if any transmissions are conducted using an unauthorized protocol. For example, employees of an organization may attempt to circumvent security measures by creating a self-signed security certificate or using a proxy server. Block 306 may be implemented to determine if transmissions through a first network (such as the Internet through WAN 129) is transmitted or received using an unauthorized protocol.

As discussed above, blocks 302-306 (as well as additional processes) may provide information regarding a user account's activity over a relatively short time period, such as 24-48 hours to quickly and effectively detect threats that may be posed against an organization. In certain embodiments, however, such as before major deadlines, user accounts may appear to show a rise in improper or unauthorized activity that is unwarranted. Furthermore, certain user accounts naturally will show more activity than other user accounts given the inherent nature of the individual's job associated with that user account. Thus, values obtained during the first time period may be compared with other values to more accurately determine the ranking For example, in one embodiment, the values of controls received over the first time period (such as through blocks 302, 304, and/or 306) may be compared with values obtained over a second time period (i.e., block 308). In one embodiment, the second time period is longer in duration than the first time period. For example, the second time period may be about one month, about 45 days, or about 2 months. Indeed, any amount of time is to be within the scope of this disclosure. Further, the first and the second time periods may be overlapping, such as the first time frame may include the most recent 2 days while the second time period includes the most recent 45 days. Those skilled in the art will readily understand that the length of the time periods may depend on a myriad of factors, including the type of activity conducted, the organization's structure and activities, the IT infrastructure, and other factors.

By comparing values obtained during the first period with values of the same user account during the second period, it may be determined if a user account's activity is abnormal. Each activity measured (or notification of the results of such measurements) may be accorded a different weight, for example, a security threat may be weighted differently than an ethical threat. Likewise, a blocked transmission may be weighted differently than a transmission that is not blocked, however, contains improper material. As shown, illustrative block 310 may be implemented to weight different activities. Table 1, described below in relation to block 310, provides one illustrative weighting scheme that may be implemented in block 308 or any other process in accordance with the invention. While block 308 is shown below block 306, those skilled in the art will readily appreciate that block 308 may occur before, during, or after any block. In one embodiment, one or more processes may be conducted as soon as the activity is detected.

Illustrative block 308a may be employed to receive an indication if a user account comprises an activity level during the first time period that is over a first threshold level above an average of the same user account during the second time period (denoted hereafter as "spike$_x$", where $_x$ is the specific activity. For example, in one embodiment, each activity considered as part of blocks 302-306 (and even 308) may be considered. Yet in other embodiments, only certain activities, such as the traffic measured in sub-block 302a, is considered. In one embodiment, the predetermined threshold may be about 40% of the average of the user account's activity during the second time period. In other embodiments, the predetermined threshold may be a value less than or greater than 40%.

Block 308b may be implemented to compare a user account with other user accounts. For example, in one embodiment, an indication may be received to indicate whether a user account comprises an activity level that is over a first threshold level above an average of a plurality of user accounts for the same time period (hereinafter referred to as "aboveavg$_x$", where $_x$ is the specific activity or control).

The timing of a user account's activity within the first or second time period may be considered in any analysis (see, e.g., block 308c). In one embodiment, an indication may provide information whether the user account comprises an activity level during a time frame within the first time period that is determined to be before or after the average start or end time for that user account. For example, if a user account suddenly shows a lot of activity during a different frame (i.e., about 6 hours before they are scheduled to work) this may be weighted to further increase the user account's ranking. In one embodiment, the user account's activity level during a second time period (which may be expressed as an average) is compared with the recent activity level. In other embodiments, certain time frames, such as holidays, weekends may be weighted in additional analysis. In one embodiment, the output of block 308c may be expressed as OffHours$_x$, where $_x$ is the specific activity.

In one embodiment, each of block 308a-308c may be implemented. One illustrative embodiment implementing blocks 308a-308c is described later in this disclosure.

In further embodiments, a weight assigned to an activity may depend on whether the activity occurred within the first time period or another time period (block 310). The second time period may include all past data obtained for the relevant activity. Table 1 shows one illustrative weighting scheme that may be used in accordance with various embodiments of the invention. As shown in Table 1, a weighting applied to an activities may differ from at least one other activity, even if it occurs during the same time frame. Additionally, a weighting applied to an activity may differ depending if the activity occurred during the first time period or during a second time period.

TABLE 1

Exemplary weighting scheme

| Control | Weight - If occurred during first time period | Weight - If occurred during another time period (i.e. second time period or all past data) |
|---|---|---|
| Security Threat | 3.5 | 2 |
| Ethical Threat | 1.5 | 1 |
| Unauthorized Protocol | 3.5 | 2 |
| Illegal write attempt | 5 | 3 |
| Blocked Targeted Correspondence | 5 | 3 |
| Access to specific data store | 3.5 | 2 |
| Targeted Correspondence that violates rule | 4 | 3 |

Those skilled in the art will readily appreciate that the above categories are merely illustrative and that other categories may be implemented. Further, at least one of the categories may further be subdivided into one or more subcategories.

In further embodiments, a weight may be assigned to certain user accounts (see, e.g., block 312). In certain scenarios, it may be advantageous to weight one account differently than another. For example, certain user accounts may have access to highly sensitive data, thus the potential for adverse events, impacts, and/or effects is greater. In this regard, different weights may be assigned to different user accounts, regardless of what activity is conducted on that account. For example, one or more different weights may be assigned to accounts depending on one or more criteria. Exemplary criteria may include, but is not limited to: whether the account has access rights to a specific collection of data, whether the account is exempt from having the at least one application (such as for example, a security application), whether the at least one software application is absent; whether access rights to at least one service have been deactivated, and combinations thereof. Table 2 shows an exemplary weighting scheme that may be applied to one or more user accounts in accordance with one embodiment of the invention.

| User Account Category | Weight |
|---|---|
| Access to a collection of data | 2 |
| Exempt from application | 1.5 |
| Application missing | 1.5 |
| Exception to monitoring traffic through a network | 1 |

| User Account Category | Weight |
|---|---|
| Exception to monitoring of targeted communication application | 1 |
| Deactivated User | 2 |

Those skilled in the art will readily appreciate that the above categories are merely illustrative and that other categories may be implemented. Further, at least one of the categories may further be subdivided into one or more subcategories.

Certain aspects of the invention are related to computer-readable mediums, such as including memory 115 that contain computer executable instructions, that when executed by a processor, such as processor 103, processes a unique process that incorporates one or more of the principles disclosed above in relation to blocks 302-312. In one embodiment, the computer-executable instructions may be used to calculate a threat score for a plurality of user accounts. As discussed above, some accounts may have access to a first network (such as the Internet) and at least a portion of the user accounts have access to a second network that comprises a centralized store of electronic data, for example confidential information on the organization's intranet.

In one embodiment, an overall threat score ($f_{overall}$) may be calculated for each of the user accounts. In one embodiment, $f_{overall}$ may be determined according to Equation 1:

$$f_{overall} = \frac{(f_{live} + f_{analytic}) * f_{person}}{100} \quad \text{Equation 1}$$

wherein $f_{live}$ includes the calculation of data from a first time period and is calculated for a plurality of activities and $f_{analytic}$ includes the calculation of data from a second time period and is calculated for the plurality of activities of $f_{live}$. Equation 1a may be used to calculate $f_{live}$ for each activity and Equation 1b may be used to calculate $f_{analytic}$.

$$-f_{live} = \sum_{x=0}^{n} x_{greaterThan0}\left(\frac{weight_{x_{live}}}{2}\right) + \left(\frac{hit_x}{max_{hit_x}}\right)\left(\frac{weight_{x_{live}}}{2}\right) \quad \text{Equation 1a}$$

where $_x$ specifies a predefined activity selected from a plurality of activities, and $$x_{greaterThan0} = \begin{cases} 1, & hits_x > 0 \\ 0, & hits_x = 0 \end{cases}$$

As discussed above, $f_{analytic}$ includes the calculation of data from a second time period and is calculated for the plurality of activities of $f_{live}$. In certain embodiments, the determination of $f_{analytic}$ may include one or more sub-blocks of 308, including 308a, 308b, and/or 308c. For example, Equation 1b provides on illustrative method:

$$f_{analytic} = (spike_x + aboveAvg_x + offHours_x) * (weight_{x_{analytic}}) \quad \text{Equation 1b}$$

Wherein in one embodiment, $spike_x$ is assigned a zero value unless the user account comprises an activity level during the first time period that is over a first threshold level above an average of the same user account during the second time period, $aboveavg_x$ is assigned a zero unless the user account comprises an activity level that is over a first threshold level above an average of a plurality of user accounts for the same time period, wherein $offhours_x$ is assigned a zero unless the user account comprises an activity level during a time frame during the first time period before or after the average start or end time for that user account.

Returning briefly to Equation 1, there is a variable "$f_{person}$." In the illustrated embodiment, herein $f_{person}$ considers any weights given to the user account. In one embodiment, one or more values from block 312 are used for $f_{person}$.

The exact weights and thresholds applied to the equation may depend on a myriad of factors, including but not limited to preference. For example, some organizations may treat certain behaviors or trends as more risky than others. In one embodiment, $spike_x$ is assigned a first integer if the first threshold level of $spike_x$ is about 40% greater than the average of the same user account during the second time period. In another embodiment, $aboveavg_x$ is assigned a first integer if the first threshold level of $aboveavg_x$ is above about 30% greater than the activity of the plurality of user accounts for the same time period. In a further embodiment, the $offhours_x$ may be assigned a first integer if the activity level is detected about 6 hours before or after the average start or end time for that user account.

The controls or activities considered for inclusion within the formula to rank the plurality of user accounts may consider any activity, including but not limited to any activity discussed in relation to FIG. 3. Some illustrative activities may include, but are not limited to: a security threat, an ethics threat, blocked transmission through the targeted communication application, transmission through the targeted communication application meeting the predefined criterion, accessing the centralized store, an attempted illegal storage attempt, and combinations thereof.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

We claim:

1. A computer-implemented method comprising:
   determining, by a system having at least one computing device, a first threat score corresponding to a first time period for a plurality of user accounts comprising at least a first user account, each user account having access to a first network and at least a portion of the user accounts having access to a second network that comprises a centralized store of electronic data, the determined first threat score for each user account being based at least in part on:
   receiving, by the system, at least one of an indication of activity through the first network for the presence of a security threat, an ethics threat, or combinations thereof;
   receiving, by the system, an indication indicative of any blocked transmissions and non-blocked transmissions through a targeted communication application associated with the user account that meet a predefined criterion, wherein the targeted communication application is selected from the group consisting of: electronic mail (e-mail), instant messaging (IM), chatting, and combinations thereof; and determining, by the system, if a transmission through the first network is transmitted or received through an unauthorized protocol;

comparing, by the system, the determined first threat score of the first user account with a second threat score of the same first user account corresponding to a second time period to identify an overall threat score for the first user account and a ranking of the first user account; and displaying the ranking on a graphical user interface.

2. The method of claim 1, further comprising:
applying a weight to at least one user account of the plurality of user accounts, wherein the weight is assigned to the at least one user account if the user account is in the group consisting of: granted access rights to a specific collection of data, exempt from having at least one software application, the at least one software application is absent; access rights to at least one service has been deactivated, and combinations thereof.

3. The method of claim 2, further comprising:
receiving an indication whether at least one security application is associated with the user account, wherein if the at least one security application is associated with the user account, then:
monitoring illegal storage attempts; and
recording a filename associated with illegal storage attempts; and
if the at least one security application is not associated with the user account, then applying a first weight to the user account wherein the first weight is utilized in the calculation of the overall threat score; and
wherein if the at least one security application is disabled for the user account, then applying a second weight to the user account, wherein the second weight is utilized in the calculation of the overall threat score.

4. The method claim 1, wherein the first time period is less than 3 days and the second time period is more than 40 days.

5. The method of claim 1, further comprising:
applying an activity weight to at least one activity selected from the group consisting of: a security threat, an ethics threat, blocked transmission of the targeted communication application, transmission through the targeted communication application meeting the predefined criterion, attempted access to the centralized store, an attempted illegal storage attempt, and combinations thereof.

6. The method of claim 5, further comprising:
applying a second activity weight to at least one activity if the at least one activity occurred during a first time frame within either the first or second time period.

7. The method of claim 6, wherein the first time frame is selected from a predefined quantity of time before a user associated with the user account is scheduled to utilize a network, a predefined quantity of time before or after an average time frame the user account is active on a network, a specific date, and combinations thereof.

8. The method of claim 7, wherein the activities that occurred during the first time period are weighted differently than the activities that occurred during the second time period.

9. The method of claim 8, wherein individual instances of the activities of a security threat, an ethics threat, blocked transmission of the targeted communication application, transmission through the targeted communication application meeting the predefined criterion, attempted access to the centralized store, and an attempted illegal storage attempt that occurred during the first time period are assigned weights of 3.5, 1.5, 3.5, 5, 5, 3.5 and 4, respectively; and individual instances of the activities that occurred during the second time period are assigned weights of 2, 1, 2, 3, 3, 2 and 3, respectively.

10. The method of claim 5, further comprising:
applying a second activity weight to at least one activity if an incidence of activity is above a predetermined threshold.

11. The method of claim 10, wherein the predetermined threshold is based upon, the user account's average activity, average activity of other user accounts, or combinations thereof.

12. The method of claim 11, further comprising:
assigning a weight to at least one user account of the plurality of user accounts, wherein a weight is assigned to the at least one user account if classified in the group consisting of: access rights to a specific collection of data, exempt from having the at least one software application, the at least one software application is absent; access rights to at least one service has been deactivated, and combinations thereof.

13. The method of claim 12, wherein the user accounts classified by: access rights to a specific collection of data, exempt from having the at least one software application, the at least one software application is absent; access rights to at least one service has been deactivated are assigned weights of 2, 1.5, 1.5, 1, 1, and 2, respectively.

14. The method of claim 1, wherein a software application from the at least one software application is configured to perform an action selected from the group consisting of:
preventing unauthorized writing of data to a specific location, monitor a transfer of data through the first network, monitor a transfer of data using the communication protocol.

15. A computer-implemented method comprising:
determining, by a system having at least one computing device, a first threat score corresponding to a first time period for a plurality of user accounts within a first domain, the plurality of user accounts including a first user account assigned to a first individual, wherein each user account is assigned to a particular individual, and only a portion of the user accounts have access to a second network that comprises a centralized store of electronic data internal to the domain, the determined first threat score for each user account is based at least in part on:
receiving, by the system, at least one of an indication of activity by the user account through the first network for the presence of a security threat, an ethics threat, or combinations thereof;
receiving, by the system, an indication indicative by the user account of any blocked transmissions and non-blocked transmissions through a targeted communication application associated with the user account that meet a predefined criterion, wherein the targeted communication application is configured to permit the first individual to transmit and/or receive electronic information directly with a second account of the plurality of accounts that is associated with a second individual; and
determining, by the system, if a transmission by the user account through the first network is transmitted or received through an unauthorized protocol;
comparing, by the system, the first threat score of the first user account with a second threat score from the same first user account corresponding to a second time period to create an overall threat score for the first user account and a ranking for the first user account; and displaying the ranking on a graphical user interface.

16. The method of claim 15, wherein the targeted communication application is configured to transmit communications from the first user account assigned to the first individual to a second user account within the first domain assigned to a second individual.

17. The method of claim 15, wherein the targeted communication application is configured to transmit communications from the first user account assigned to the first individual to a second user account assigned to a second individual.

* * * * *